United States Patent [19]
Ahn

[11] Patent Number: 5,818,670
[45] Date of Patent: Oct. 6, 1998

[54] SWITCHING MODE POWER SUPPLY WITH PROTECTION FUNCTION AGAINST OVERCURRENT AND OVERVOLTAGE

[75] Inventor: Jung-Hyun Ahn, Suwon, Rep. of Korea

[73] Assignee: Samsung Electronics Co., Ltd., Kyungki-do, Rep. of Korea

[21] Appl. No.: 814,506

[22] Filed: Mar. 10, 1997

[30] Foreign Application Priority Data

Mar. 8, 1996 [KR] Rep. of Korea .................. 1996 6136
Mar. 29, 1996 [KR] Rep. of Korea .................. 1996 9319

[51] Int. Cl.$^6$ ................................................. H02H 7/00
[52] U.S. Cl. ............................ 361/18; 361/79; 361/90; 363/21
[58] Field of Search .......................... 361/18, 86, 87, 361/90, 91, 92, 111, 79; 363/50, 52, 74–76, 78–79, 21

[56] References Cited

U.S. PATENT DOCUMENTS

| 4,916,569 | 4/1990 | Konopka ................................. | 361/18 |
| 5,124,906 | 6/1992 | Kang ...................................... | 363/21 |
| 5,448,469 | 9/1995 | Rilly et al. ............................. | 363/21 |
| 5,633,787 | 5/1997 | Song ...................................... | 363/21 |

*Primary Examiner*—Brian K. Young
*Assistant Examiner*—Michael J. Sherry
*Attorney, Agent, or Firm*—Robert E. Bushnell Esq.

[57] ABSTRACT

A switching mode power supply which controls power source supplied to electronic equipment, which is designed to protect a circuit against an overvoltage through a power line of coil or overcurrent on the occurrence of short-circuit of power line. The switching mode power supply of the present invention comprises a switching transformer for receiving DC voltage to a primary coil from a rectifier, and inducing respective different predetermined voltages into a plurality of coils on the secondary and third side of respective different turns ratio, an error detection and feedback for inputting the voltage $V_A$ of a coil with the highest turns ratio of a plurality of the coils and detecting voltage errors, a switching output for outputting a control signal so as to switch a switching transformer, a current sensor for sensing a current signal transmitted from the switching output, a pulse width modulation controller for inputting a voltage error fed back from the error detection and feedback and an output current from the current sensor and a voltage of the third coil, and outputting pulse width modulation signal which duty cycle is modulated in accordance with these input signals to the switching output, and an overvoltage and overcurrent protection circuit for detecting whether an overvoltage from a plurality of the coils occur, whether an undervoltage from a plurality of the coils occur or not, and continuously stopping an operation of pulse width modulation controller when detecting the overvoltage or the undervoltage.

18 Claims, 5 Drawing Sheets

SWITCHING MODE POWER SUPPLY WITH PROTECTION FUNCTION AGAINST OVERCURRENT AND OVERVOLTAGE

CLAIM OF PRIORITY

This application makes reference to, incorporates the same herein, and claims all benefits accruing under 35 U.S.C §119 from an application entitled A Switching Mode Power Supply With Overcurrent And Overvoltage Protection Function earlier filed in the Korean Industrial Property Office on 8 Mar. 1996 and there duly assigned Serial No. 96-6136, and from an application entitled A Switching Mode Power Supply With Overcurrent Protection Function earlier filed in the Korean Industrial Property Office on 28 Mar. 1996, and there duly assigned Serial No. 96-9319, by that Office.

BACKGROUND OF THE INVENTION

1. Field of the Invention

The present invention relates to a switching mode power supply (SMPS) for controlling power to an electronic apparatus, and more particularly to a switching mode power supply with a protection function of an electric apparatus against an overvoltage and overcurrent in the event that a power line is short-circuited.

2. Description of the Prior Art

In general, a conventional switching mode power supply employing PWM (pulse width modulation) mode has controlled a power of an electronic apparatus by performing a line regulation on the primary side of power and a load regulation on the secondary side of power by means of PWM controller. U.S. Pat. No. 5,448,469 to Gerard Rilly, et al. entitled Switch Mode Power Supply With Output Feedback Isolation describes such a SMPS.

A SMPS performs a line regulation by sensing the current from an output signal of a switching section controlled by a PWM controller, performs a load regulation by detecting the voltage change induced from a coil of the largest turns ratio of the secondary loads of the power, and has compensated the secondary side voltage of the power for passing the results of the line regulation and the load regulation back to the PWM controller.

A switching mode power supply (SMPS) may include an AC input section, a rectifier, a switching transformer, a switching output, a PWM controller, a current sensor, an output section, and an error detection and feedback section. The AC input section applies an AC voltage which is input from the exterior to the rectifier, and the rectifier rectifies the AC voltage applied from the AC input into a DC voltage and outputs the DC voltage to a primary coil of the switching transformer. The switching transformer inputs the DC voltage from the rectifier and induces respective different predetermined voltages to loads, i.e., coils, on the secondary side and a load on the tertiary side, each having respective different turn ratios, by switching according to the control signal applied from a switching output circuit. The output section includes a plurality of outputs for the purpose of rectifying and smoothing a voltage induced into the respective loads, and then outputs respective different predetermined voltages. Each respective output of the output section constitutes a rectifying diode and a smoothing capacitor for rectifying and smoothing voltages induced on the respective loads of the switching transformer. An error detection and feedback section detects an error of the highest voltage, induced on the load having the highest turns ratio, output from the output section, and feeds back the detected voltage errors to the PWM controller. A switching output circuit, which is composed of a switching element such as a field effect transistor (FET), controls ON and OFF time of the primary coil of the switching transistor by means of the PWM signal outputted from the PWM controller. A current sensor senses an output current from the switching output circuit, and supplies the sensed current to the PWM controller. The PWM controller inputs a voltage error detected by the error detection and feedback section and the output current of the switching output circuit sensed by the current sensor, and a voltage induced on a tertiary coil of the switching transformer, and then outputs PWM signals with a duty cycle modulated in accordance with the input signals to the switching output circuit.

In a SMPS with a construction as is described above, the PWM controller controls the power source on the primary side of the switching transformer by means of the output current of the switching output circuit sensed by a current sensor, and a power source on the secondary side in accordance with voltage error of the coil having the largest turns ratio on the secondary side, which is detected by the error detection and feedback section. Accordingly, it is required to prevent damage to the circuit and to prevent fire by preparing for the event that a certain one of the coils of the secondary side or tertiary side is short-circuited and an overcurrent flows. Therefore, when the voltage level on an input terminal of PWM controller from the current sensor is over 1 Vp-p, the PWM controller outputs a PWM signal with a minimum duty cycle to the switching output circuit and then the switching output circuit switches on the switching transformer according to the PWM signal. This leads to control of a overcurrent. The switching mode power supply, however, has the following problems. First, when a coil of large turns ratio is short-circuited and an overcurrent flows, an overcurrent through the highest turns ratio coil can be restricted by controlling the ON/OFF time of the switching output circuit in response to a PWM signal with a minimum duty cycle from the PWM controller. If, however, the PWM signal with such a minimum duty cycle activates the switching output circuit and switches the switching transformer on, a voltage error, which is detected through the the error detection and feedback section, is fed back to the PWM controller. Therefore, the PWM controller outputs a PWM signal with a sufficient duty cycle to the switching output circuit by means of a voltage error detected and fed back by the error detecting and feedback section. Finally, the switching output circuit controls the operation of the switching transformer by means of the PWM signal with a sufficient duty cycle. Accordingly, although an overvoltage flows through a coil of a large turns ratio, the switching transformer operates in a normal condition because the PWM controller outputs the PWM signal with a normal duty cycle, by means of the voltage error applied from the the error detection and feedback section, to the switching output circuit. As a result, there arises a problem that a continuous flow of overcurrent through a coil of the large turns ratio causes damage to the circuit or causes a fire due to overheating.

Secondly, in the event that an overcurrent flows through a coil of the low turns ratio of the switching transformer, such overcurrent cannot be controlled by means of duty cycle of the PWM signal outputted from the PWM controller, because the overcurrent has little effect on the error detection and feedback section. Subsequently, there is a problem that an overcurrent keeps flowing through the coil and leads to damage of the circuit or causing a fire.

SUMMARY OF THE INVENTION

It, therefore, is an object of the present invention to provide a switching mode power supply with a function for protection of a circuitry against an overvoltage by detecting the overvoltage through a load of the large turns ratio.

It is another object to provide a switching mode power supply with a function for protection of a circuitry against an undervoltage, that is, overcurrent by detecting the overcurrent through a load of the low turns ratio.

The foregoing objects are accomplished by providing a rectifier for rectifying AC voltage applied through an AC input into a DC voltage, a switching transformer for receiving the DC voltage at a primary coil from the rectifier, and induced respective different predetermined voltages to a plurality of loads on the secondary and tertiary side of respective different turns ratio, an output section for inputting respective different predetermined voltages output through the loads of the switching transformer for rectifying and smoothing these voltages and outputting respective different voltages $V_A$, $V_B$, $V_C$ and $V_D$, an error detection/feedback for inputting the voltage $V_A$ of one of the loads whose turns ratio is the highest of all the loads, a switching output for outputting a control signal so as to switch the switching transformer, a current sensor for sensing a current signal transmitted from the switching output, a PWM controller for inputting a voltage error fed back from the error detecting/feedback section and an current output from a current sensor and a voltage of a tertiary load for outputting a PWM signal which duty cycle is modulated in accordance with these input signals, and an overvoltage and overcurrent protection circuit for detecting whether an overvoltage occurs or not on the plurality of loads, whether an undervoltage occurs or not on the loads, and for putting a shutdown to the PWM controller when detecting the overvoltage or undervoltage. The switching mode power supply of the present invention provides a function which detects an overvoltage from a load whose turns ratio is large and an undervoltage from a load whose the turns ratio is small, and interrupts continuously the operation of PWM controller in an abnormal state which is detected an overvoltage through a load whose turns ratio is large or an undervoltage a load whose turns ratio is small. As a result, it is possible to prevent the damage to a circuit.

The present invention will be described with reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
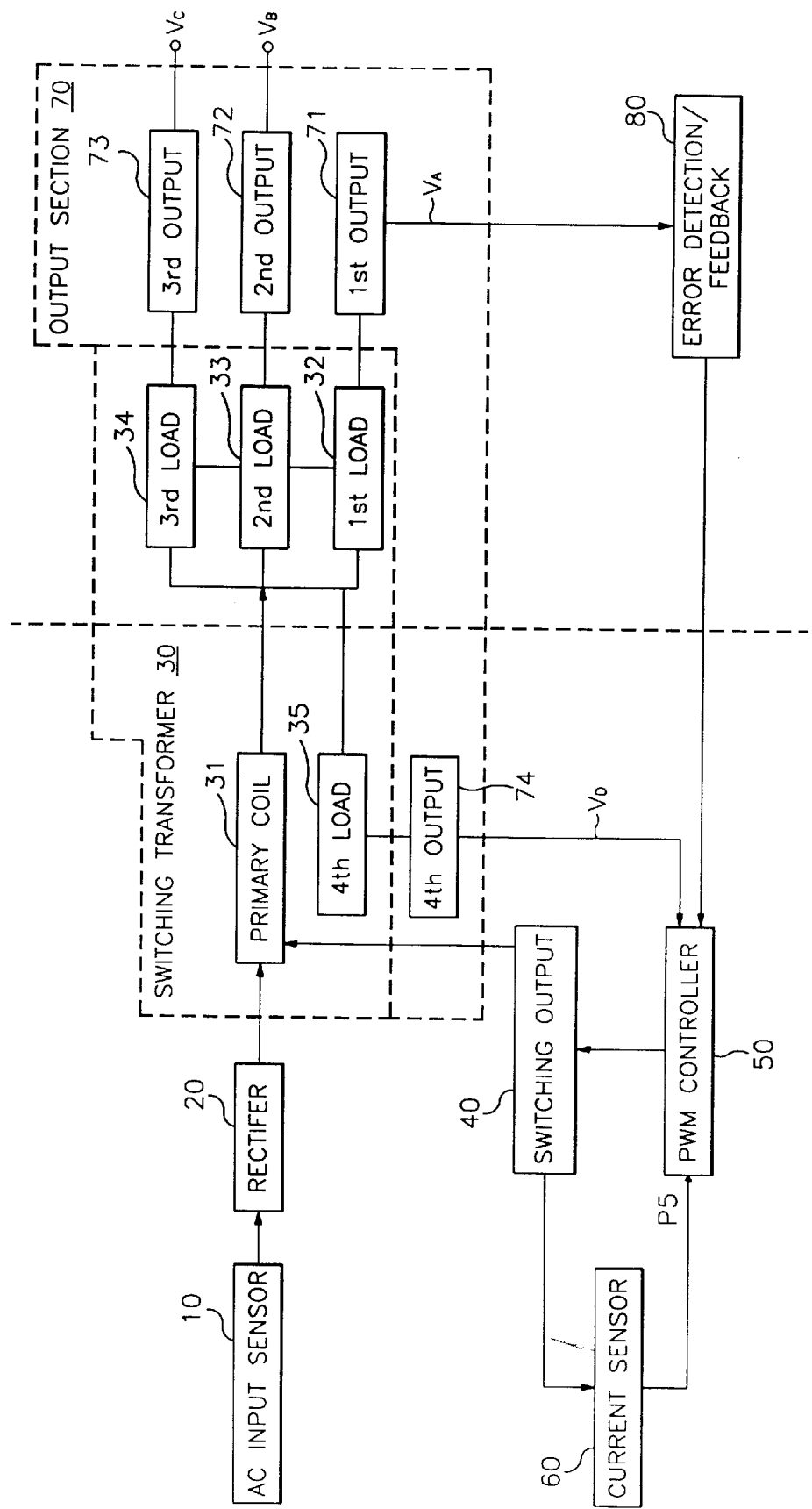
FIG. 1 is a constructive view of a examplary switching mode power supply.

FIG. 1 is an examplary block diagram of a switching mode power supply (SMPS). Referring to FIG. 1, the SMPS includes an AC input section 10, a rectifier 20, a switching transformer 30, a switching output 40, a PWM controller 50, a current sensor 60, an output section 70, and an error detection and feedback 80.

AC input section 10 applies an AC voltage which is input from the exterior to a rectifier 20, and rectifier 20 rectifies the AC voltage applied from the AC input into a DC voltage and outputs the DC voltage to a primary coil 31 of switching transformer 30. Switching transformer 30 inputs the DC voltage from rectifier 20, and induces the respective different predetermined voltages to loads, i.e., coils, 32–34 on the secondary side and load, i.e., coil, 35 on the tertiary side each having respective different turn ratios by switching according to the control signal applied from switching output 40.

An output section 70 includes a plurality of outputs 71–74 for the purpose of rectifying and smoothing a voltage induced into respective coils 32–35, and then outputting the respective different predetermined voltages $V_A$, $V_B$, $V_C$ and $V_D$. Each respective output 71–74 of output section 70 constitute a rectifying diode and a smoothing condenser for rectifying and smoothing voltages induced on respective coils 32–35 of switching transformer 30.

An error detection/feedback 80 detects an error of the highest voltage $V_A$ induced on coil 32, whose turns ratio is the highest of coils 32–35, and output through output section 70, and feeds back the detected voltage errors to PWM controller 50.

A switching output 40, which is composed of a switching element such as a field effect transistor (FET), controls ON, OFF time by means of the PWM signal outputted from PWM controller 50. Accordingly, switching output 40 switches on switching transformer 30 by means of the PWM signal outputted from PWM controller 50. A current sensor 60 senses an output current from the switching output 40, and supplies the sensed current to PWM controller 50. PWM controller 50 inputs a voltage error detected by error detection/feedback 80, an output current of switching output 40 sensed by a current sensor 60, and a voltage induced on tertiary coil 35 of switching transformer 30, and then outputs PWM signals with a duty cycle modulated in accordance with the input signals to switching output 40.

In a SMPS with a construction as is described above, PWM controller 50 has controlled a power source on the primary side of the switching transformer 30 by means of the output current of the switching output 40 sensed by a current sensor 60, and a power source on the secondary side in accordance with voltage error of the coil having the largest turns ratio on the secondary side, which is detected by error detection/feedback 80. Accordingly, it is required to prevent damage to the circuit and to prevent fire by preparing for the event that a certain one of the coils of the secondary side or tertiary side is short-circuited and an overcurrent flows. Therefore, when the voltage level on a terminal P5 of PWM controller 50 from current sensor 60 is over 1 Vp-p, PWM controller 50 outputs a PWM signal with a minimum duty cycle to switching output 40 and then switching output 40 switches on switching transformer 30 according to the PWM signal.

Figure 2:
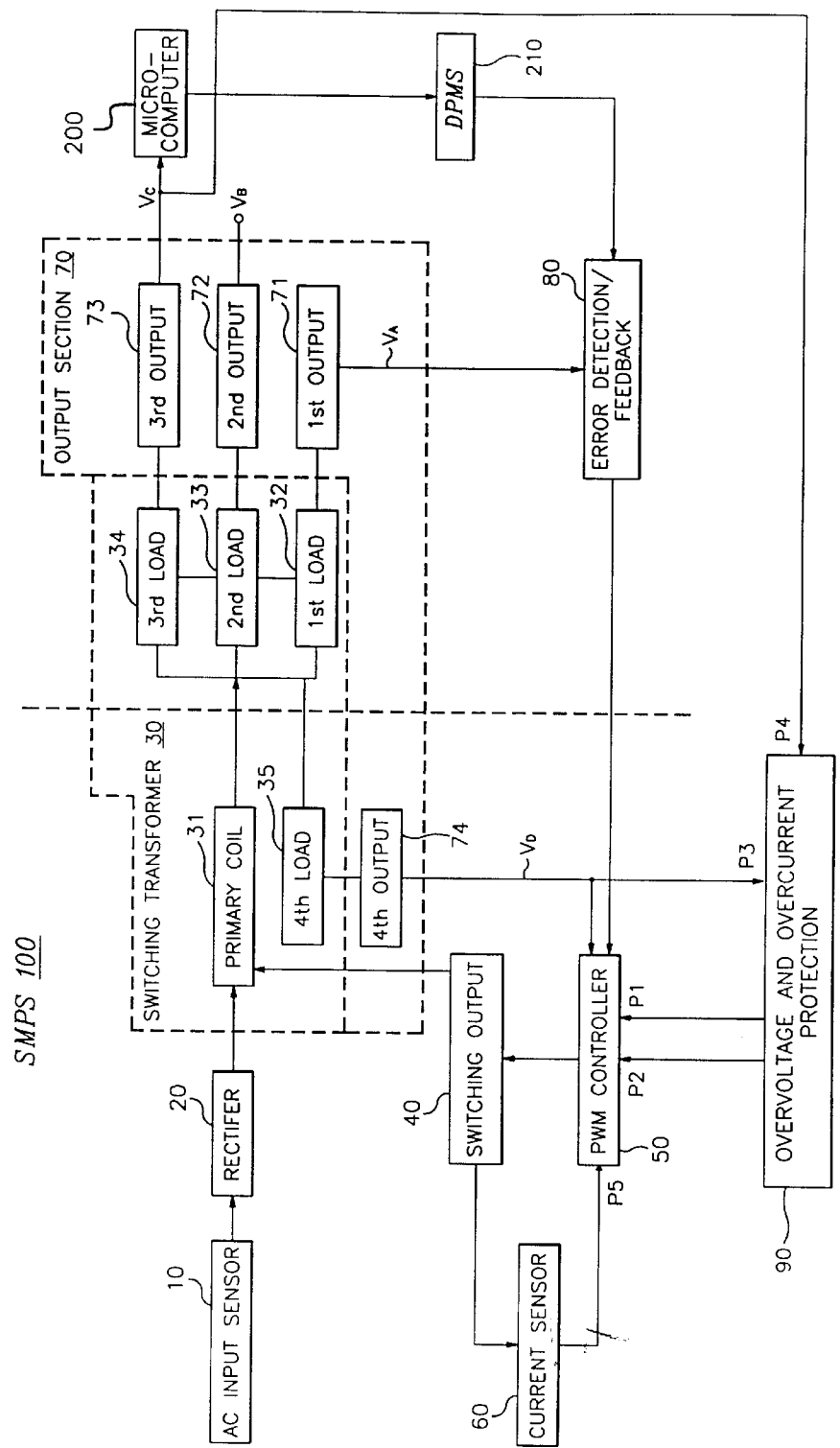
FIG. 2 is a block diagram of a switching mode power supply with an overcurrent and overvoltage protection circuitry function according to the principles of the present invention.

Referring to FIG. 2, a switching mode power supply 100 comprises an AC input 10, a rectifier 20, a switching transformer 30, a switching output 40, a PWM controller 50, a current sense 60, an output section 70, and an error detection and feedback circuit 80 just like the switching mode power supply shown in FIG. 1.

A switching mode power supply of the present invention further comprises an overvoltage and overcurrent protection circuit 90 which detects an overvoltage through the fourth coil 35 of the second highest turns ratio, an undervoltage from the third coil 34 of the lowest turns ratio, and gives a continuous shutdown to the PWM controller 50 in an abnormal state which an overvoltage is detected through fourth coil 35 or an undervoltage is detected through third coil 34.

Display Power Management Signaling circuit (DPMS) 210 normally maintains only a power source of microcomputer 200 so as to save a power source, and makes other power sources drop according to a power source saving mode. Consequently, it is required for a switching mode power supply of the present invention to detect an undervoltage through third coil 34 which supplies power to microcomputer 200.

The components of FIG. 2 having the same reference numerals as in FIG. 1 operate the same, except that PWM controller 50, inputs signals indicative of a fault condition detected by overvoltage and overcurrent protection circuit 90, such that overvoltage and overcurrent protection circuit 90 continuously shuts down a drive voltage of PWM controller 50 to stop the switching operation of switching transformer 30.

The operation of a switching mode power supply of the present invention will be discussed as below.

AC voltage applied from an AC input 10 is rectified into DC voltage by a rectifier 20, DC voltage from the rectifier 20 is applied to a coil on the primary side 31 and respective different predetermined voltages are induced to the secondary and tertiary coil of a plurality of coils 32–35.

An error detection and feedback circuit 80 detects a voltage error from a voltage $V_A$ of a coil 32 of the highest turns ratio, that is, the highest voltage level $V_A$ of voltages $V_A$, $V_B$, $V_C$, $V_D$ of a plurality of coils 32–35 outputted through an output section 70, and feed backs the error to PWM controller 50, and then a current sense 60 senses a current from an output signal of a switching output 40, and supplies it to PWM controller 50.

Accordingly, in the event an overcurrent or overvoltage could not be detected from an overvoltage and overcurrent protection circuit 90, PWM controller 50 inputs an output current of the current sense 60, a voltage error of the error detection and feedback circuit 80 and a voltage of the fourth coil 35, and outputs PWM signals with a duty cycle modulated according to these signals to a switching output 40. The switching output 40 inputs the PWM signals, and switches the primary side of a switching transformer 30, with the result that it stabilizes an output voltage of the secondary side.

On the other hand, when an undervoltage is detected from third coil 34 by overvoltage and overcurrent protection circuit 90, or an overvoltage is detected from fourth coil 35, a stopping signal P2 to stop the operation of PWM controller 50 is output from an overvoltage and overcurrent protection circuit 90. Accordingly, PWM controller 50 shuts down continuously by means of a stopping signal P2 applied from overvoltage and overcurrent protection circuit 90.

Therefore, the following continuous shutdown of switching transformer 30 results in protection of the circuit against an overvoltage and overcurrent.

Figure 3:
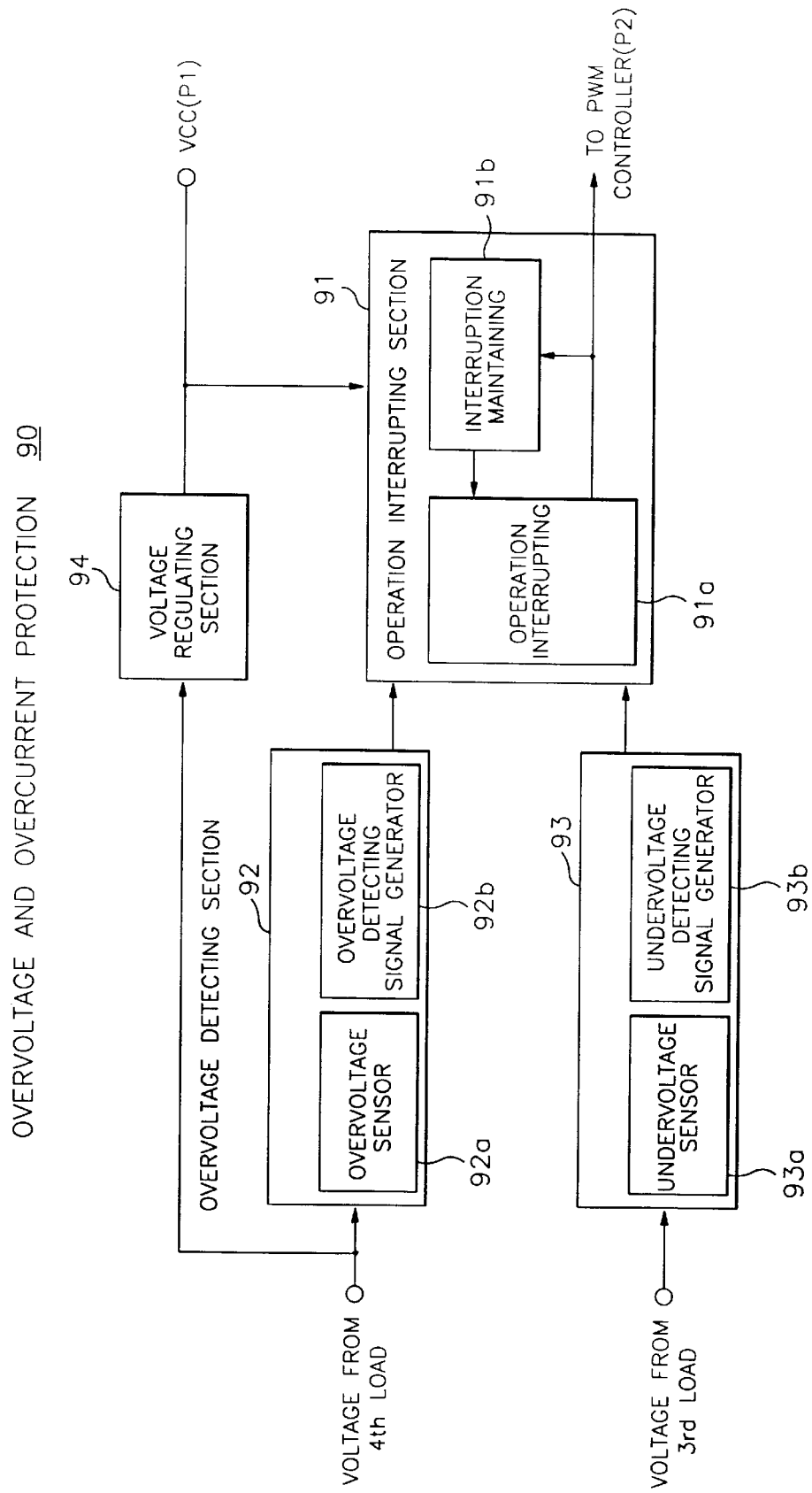
FIG. 3 is a block diagram of an overcurrent and overvoltage protection circuitry according to the principles of the present invention.

Referring to FIG. 3, overvoltage and overcurrent protection circuit 90 comprises an overvoltage detecting section 92 which detects whether an overvoltage occurs on fourth coil 35 and outputs an overvoltage detecting signal on the occurrence of an overvoltage, an undervoltage detecting section 93 which detects whether an undervoltage occurs on third coil 34 and outputs an undervoltage detecting signal on the occurrence of an undervoltage or overcurrent, an operation interrupting section 91 which outputs to PWM controller 50 a stopping signal P2 to stop the operation of PWM controller 50 in case an overvoltage detecting signal is applied from the overvoltage detecting section 92, or in case an undervoltage detecting signal is applied from the undervoltage detection section 93, and a voltage regulating section 94 which inputs a voltage of fourth coil 35 and applies a constant voltage Vcc independent of a voltage change of fourth coil 35 to operation interrupting section 91 and PWM controller 50. Undervoltage detecting section 93 detects any occurrence of an undervoltage on third coil 34 which supplies a power source to microcomputer 200, and an overvoltage detecting section 92 detects any occurrence of an overvoltage on fourth coil 35. The overvoltage and overcurrent protection circuit 90 in FIG. 3 detects whether an overvoltage occurs on fourth coil 35 through overvoltage detecting section 92 and whether an undervoltage occurs on third coil 34 through undervoltage detecting section 93, and operation interrupting section 91 inputs an overvoltage detecting signal of overvoltage detecting section 92 or an undervoltage detecting signal of undervoltage detection section 93 and outputs stopping signal P2 to PWM controller 50 to shut down PWM controller 50. The overvoltage detecting section 92 of an overvoltage and overcurrent protection circuit 90 comprises an overvoltage sensor 92a for inputting a voltage from the fourth coil 35 through a terminal P3 and sensing whether an overvoltage occurs on the fourth coil 35, and an overvoltage detecting signal generator 92b for inputting an output signal of the overvoltage sensor 92a and generating an overvoltage detecting signal. The undervoltage detection section 93 of the overcurrent and overvoltage protection 90 is composed of an undervoltage sensor 93a for inputting a voltage from the third coil 34 through a terminal P4 and sensing an occurrence of an undervoltage on the third coil 34, and an undervoltage detecting signal generator 93b for inputting an output signal of the undervoltage sensor 93a and generating an undervoltage detecting signal. The operation interrupting section 91 of the overvoltage and overcurrent protection circuit 90 includes an operation interrupting circuit 91a for inputting an overvoltage detecting signal from the overvoltage detecting section 92 or an undervoltage detecting signal from an undervoltage detecting section 93 and outputting an operating interrupting signal to stop the operation of PWM controller 93, and an interruption state maintaining circuit 91b for inputting the operating interrupting signal from the operation interrupting circuit 91a and outputting a signal to maintain an operating interrupting state of PWM controller 50.

Figure 4:
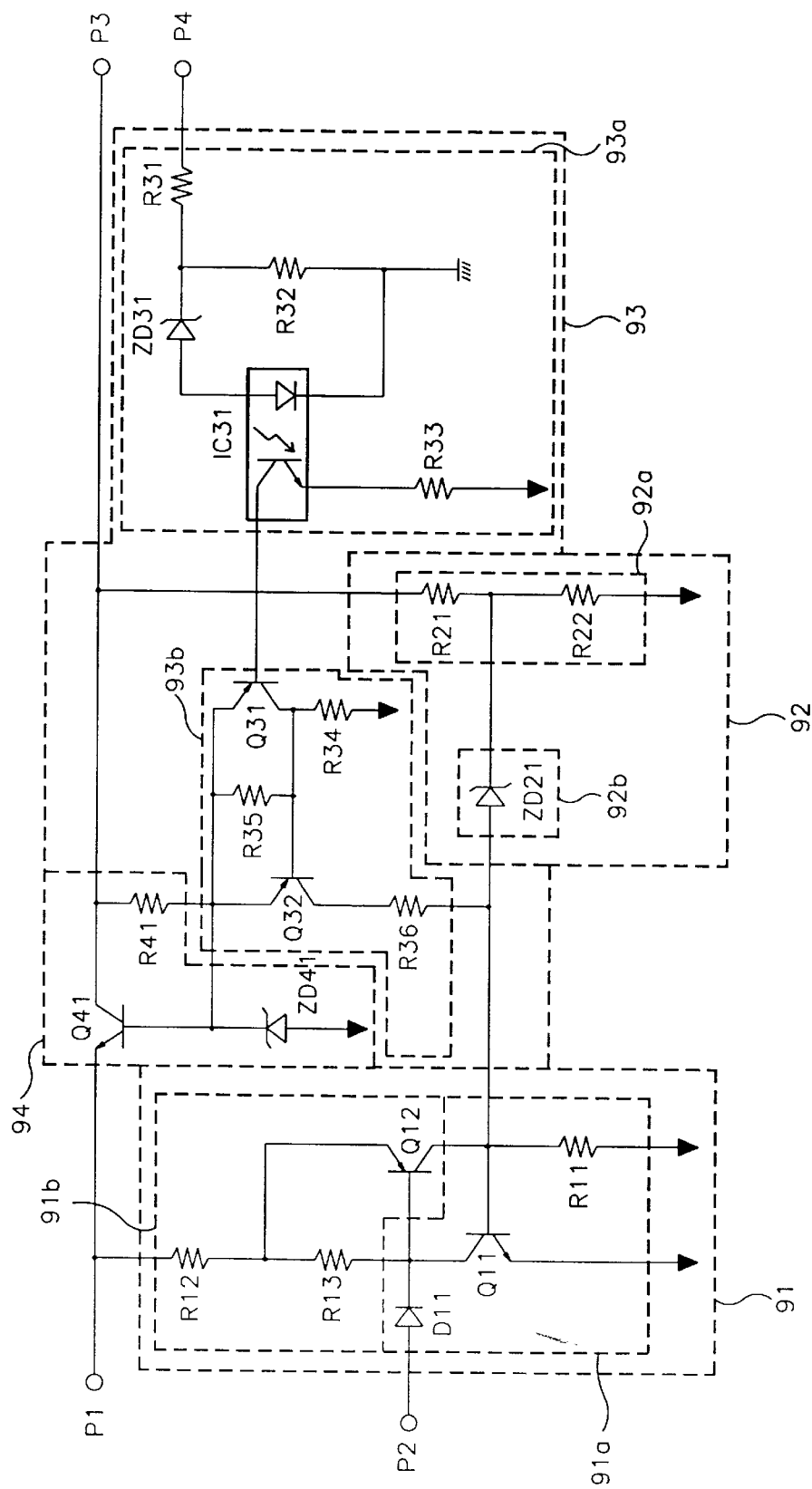
FIG. 4 is a detail view of an overcurrent and overvoltage protection circuitry in FIG. 3 according to the principles of the present invention.

The overvoltage and overcurrent protection circuit 90 is shown in detail in FIG. 4. Referring to FIG. 4, the overvoltage sensor 92a of the overvoltage detecting section 92 is composed of a resistor R21 whose one end is connected to the terminal P3 to which a voltage is applied from the fourth coil 35 and a resistor 22 whose other end is connected to another end of the resistor R21 and another end is grounded, distributes a voltage from the fourth coil 35 by the resistors R21 and R22 and outputs the divided voltage to an overvoltage sense signal. The overvoltage detecting signal generator 92b comprises zener diode ZD21, which a cathode thereof is connected to the connecting point of resistors R21 and R22, generates an overvoltage detecting signal to an operation interrupting section 91 by turning on if a divided voltage of an overvoltage sensing signal from the overvoltage sensor 92a is over a zener voltage of zener diode ZD21.

The undervoltage sensor 93a of the undervoltage detection section 93 is connected between a ground and a terminal P4 to which a voltage $V_C$ of the coil 34 is applied, and includes resistors R31, R32 for distributing a voltage $V_C$ applied through the terminal P4, a zener diode ZD31 driven according to the divided voltage of resistors R31 and R32 a photocoupler IC31 for outputting an undervoltage sensing signal according to the driving state of zener diode ZD31, a resistor R33 whose one end is connected to the light receiving element of the photocoupler and the other end is grounded, a cathode of the zener diode being connected to the connecting point of resistors R31 and R32 the photocoupler IC 31 being connected to the zener diode.

The undervoltage detecting signal generator 93b of undervoltage detection section 93 includes a first transistor Q31 whose base is connected to sensor 93a and a power voltage of fourth coil R35 is applied to an emitter through terminal P3, first transistor Q31 is driven by a sensing signal from sensor 93a , a resistor R34 whose one end is connected to a collector of transistor Q31 and the other end is grounded, a resistor R35 connected between an emitter and a collector of transistor Q31, a second transistor Q32 whose base is connected to a collector of transistor Q31 and a power voltage $V_D$ of fourth coil 35 is applied to an emitter of transistor Q32 through terminal P3, second transistor Q32 generating an undervoltage detecting signal according to the driving state of first transistor Q31, and a resistor R36 whose one end is connected to a collector of transistor Q32 and other end is connected between an operation interrupting section 91 and an overvoltage detecting section, resistor R36 applying an undervoltage detecting signal to operation interrupting section 91.

Operation interrupting circuit 91a of operation interrupting section 91 includes a transistor Q11 whose emitter is grounded, the overvoltage detecting signal from overvoltage detecting section 92 or the undervoltage detecting signal from undervoltage detecting section 93 being applied to a base thereof, a resistor R11 connected to the base thereof, and a diode D11 whose cathode is connected to a collector of transistor Q11 and an anode connected to a terminal P2 of PWM controller 50, diode D11 outputs an operating interrupting signal to PWM controller 50 according to the driving state of PWM controller 50.

Operating interrupting maintaining circuit 91b of operation interrupting section 91 includes a transistor Q12 whose base and emitter are connected to operation interrupting circuit 91a. Transistor Q12 inputs the operating interrupting signal from operating interrupter 91a and outputs a maintaining signal of an operating interrupting state of PWM controller 50. Resistors R12 and R13 are connected in series between a terminal P1 to which a power voltage Vcc is applied and operation interrupting circuit 91a, such that resistors R12 and R13 divide power voltage Vcc and applying it to an emitter of transistor Q12.

Voltage regulating section 94 includes a resistor R41 having one end connected to undervoltage detecting section 93 and a voltage of forth coil 35 is applied to the other end thereof through terminal P3, a transistor Q41 whose base is connected to the one end of resistor R41 and the power voltage of forth coil 35 is applied to a collector thereof through terminal P3, transistor Q41 outputting a constant power voltage Vcc to terminal P1 independent of the voltage change of forth coil 35 applied through terminal P3, and a zener diode ZD41 connected between the base of transistor Q41 and ground, zener diode ZD41 having the purpose of applying a constant voltage to the base of transistor Q41 independent of the voltage change of forth coil 35 applied through terminal P3.

The operation of an overvoltage and overcurrent protection circuit 90 of the present invention will be discussed hereinafter. When a voltage of fourth coil 35 is applied to an overvoltage detecting section 92 through a terminal P3, the voltage of fourth coil 35 is divided by resistance value R21 and R22. At this time, in the event an overvoltage does not occur on fourth coil 35, a zener diode ZD21 turns off and an overvoltage detecting signal is not applied to operation interrupting section 91 because the divided voltage is smaller than that of zener diode ZD21. In the event an overvoltage occurs on fourth coil 35, the divided voltage is over the voltage of zener diode ZD21 and zener diode ZD21 turns on and an overvoltage detecting signal is applied to operation interrupting section 91.

When an overvoltage detecting signal is applied to operation interrupting section 91 from overvoltage detecting section 92, transistor Q11 turns on, the voltage of terminal P2 of PWM controller 50 is below one volt, and consequently, PWM controller 50 shuts down.

When an overvoltage occurs on fourth coil 35 and transistor Q12 turns on, a current flows continuously to a base of transistor Q11 so as to maintain the operating interrupting state of PWM controller 50. As transistor Q11 continuously turns on by the transistor Q12, PWM controller 50 remains off.

In the mean time, a voltage of third coil 34 is applied to undervoltage detecting section 93 through terminal P4, the voltage applied to undervoltage detecting section 93 is divided by resistors R31 and R32. In case resistors R32–R35 are not short-circuited and a voltage is outputted through output 71–74, that is, in case an overvoltage does not flow through coils, a voltage divided by resistors R31, R32 is over the voltage level of zener diode ZD31 and a zener diode ZD31 turns on and a photocoupler IC1 turns on.

In case that photocoupler IC31 turns on, by sensing that an undervoltage does not occur on third coil 34, a low state signal indicating that the undervoltage does not occur is applied to an undervoltage detecting signal generator 93b from an undervoltage sensor 93a. That is, a current flows through photocoupler IC31, a transistor Q31 of undervoltage detecting signal generator 93b turns on, a transistor Q32 turns off, the undervoltage detecting signal is not applied to an operation interrupting section 91.

However, in case of the occurrence of an undervoltage and, following by an overcurrent due to short circuit of a coil, a voltage divided by resistors R31 and R32 is below a voltage level of zener diode ZD31, whereby zener diode ZD31 turns off and photocoupler IC31 turns off. When the photocoupler turns on, by sensing that an undervoltage occurs on third coil 34, a signal in a high state indicative of the occurrence of an undervoltage is applied from an undervoltage sensor 93b to an undervoltage detecting signal generator 93b. That is, a current does not flow through photocoupler IC31 and a transistor Q31 of the undervoltage detecting signal generator 93b turns off, a transistor Q32 turns on, as a result, an undervoltage detecting signal is applied to operation interrupting section 91.

If an undervoltage detecting signal is applied from undervoltage detecting section 93 to the operation interrupting section, transistor Q11 of operation interrupting section 91 turns on by means of an undervoltage detecting signal. PWM controller 50 is shut down by making a voltage of a terminal P2 of PWM controller 50 below one volt just like when detecting the overvoltage.

If an undervoltage detecting signal is applied to operation interrupting section 91, transistor Q11 also turns on with the consequence that transistor Q12 also turns on, also, the turning on-state of transistor Q12 continuously maintains, and then PWM controller 50 is continuously shut down.

A voltage regulating section 94 inputs a voltage of fourth coil 35 through terminal P3 and applies a constant power voltage Vcc to operation interrupting section 91 and PWM controller 50. Accordingly, even though an overvoltage occurs on fourth coil 35 and is applied through terminal P3, a constant voltage Vcc is supplied to PWM controller 50 and operation interrupting section 91 independent of the occurrence of an overvoltage through a transistor Q41 because a constant voltage flows to a base of transistor Q41 by zener diode ZD41.

In the mean while, an overvoltage is detected by overvoltage detecting section 92 or an undervoltage is detected by undervoltage detecting section 93, and then, while PWM controller 50 is shut down by operation interrupting section 91, if an overvoltage or an undervoltage does not occurs on the coils, an overvoltage detecting signal from overvoltage detecting section 92 or an undervoltage detecting signal from undervoltage detecting section 93 is no longer applied to operation interrupting section 91. Accordingly, transistor Q11 of operation interrupting section 91 turns off and PWM controller 50 activates normally by making the voltage of terminal P2 of PWM controller 50 over one volt.

Figure 5:
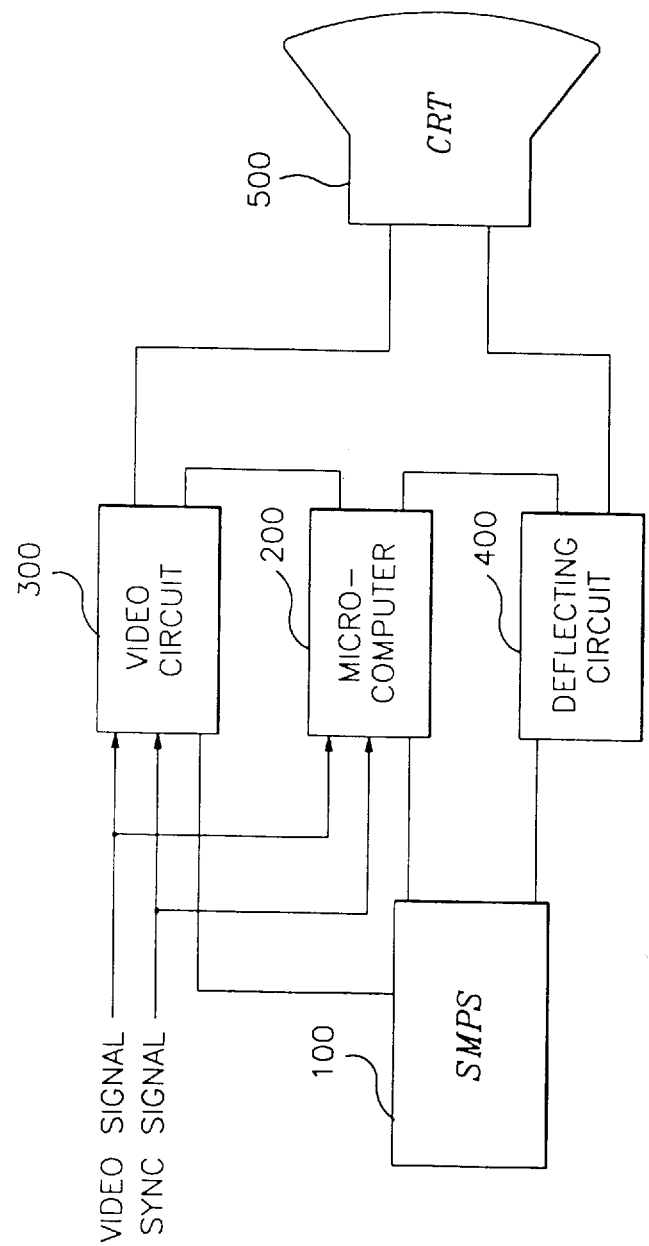
FIG. 5 is a block diagram of a display apparatus having a switching mode power supply with an overcurrent and overvoltage protection function according to the principles of the present invention.

FIG. 5 illustrates a display apparatus having the switching mode power supply shown in FIG. 2.

Referring to FIG. 5, a display apparatus comprises a video circuit 300 for inputting a vertical synchronizing and a horizontal synchronizing and a video signal, a deflecting circuit 400 for deflecting an electrical beam to a vertical and a horizontal direction, a microcomputer 200 for controlling video circuit 300 and deflecting circuit 400, a switching mode power supply 100 according to the embodiments of the present invention for applying a predetermined voltage to video circuit 300 and deflecting circuit 400 and microcomputer 200, and CRT 500 for displaying a video signal outputted from the video circuit by the output of the deflecting circuit.

The display apparatus applies power voltages $V_A$, $V_B$, $V_C$ and $V_D$ which are outputted from output section 70 of a switching mode power supply 100 having an overvoltage and overcurrent protection function to microcomputer 200, video circuit 300, and deflecting circuit 400.

Therefore, microcomputer 100 controls video circuit 300, deflecting circuit 400 so that a CRT 500 of a display apparatus can display the video signal according to the respective display modes, that is, normal state, waiting state, temporary stop state, off state by a power supply applied from switching mode power supply 100.

In case of display apparatus with a conventional switching mode power supply installed, the occurrence of an overcurrent or overvoltage due to a short-circuit or interruption can do damage to the circuit. However, in case that a switching mode power supply of the present invention is employed, when a short-circuit occurs, the switching mode power supply shuts downs. This leads to the prior prevention of damage to the circuit due to an overcurrent or overvoltage.

As explained above, the present invention is designed to prevent efficiently damage to and protect the circuit against an overvoltage or overcurrent caused by a short-circuit, etc. If, also, a switching mode power supply of the present invention having a protection function against such an overvoltage and overcurrent is incorporated into an electronic equipment, there is another advantage that it can be protected against an overcurrent and overvoltage.

What is claimed is:

1. A switching mode power supply with protection function against an overvoltage and overcurrent comprising:

a rectifier for rectifying AC voltage applied through an AC input into DC voltage;

a switching transformer for receiving DC voltage to a primary coil from the rectifier, and inducing respective different predetermined voltages to a plurality of coils of the secondary and tertiary side of respective different turns ratio;

an output for inputting respective different predetermined voltages outputted through coils of the switching transformer and rectifying and smoothing inputted voltages, and outputting respective different voltages $V_A$, $V_B$, $V_C$ and $V_D$;

an error detection and feedback section for inputting the voltage $V_A$ of the coil which the turns ratio is the highest of voltages outputted through the output and detecting voltage errors;

a switching output section for outputting a control signal to switch the switching transformer;

a current sensing section for sensing a current signal transmitted from the switching output section;

a pulse width modulation controller for inputting a voltage error fed back from the error detection and feedback section and an output current from the current sensing section and a voltage of the third coil, and outputting pulse width modulation signal which duty cycle is modulated in accordance with these input signals to the switching output section; and an overvoltage and overcurrent protection circuit for detecting whether an overvoltage from a plurality of the coils occurs, whether an undervoltage from a plurality of the coils occurs and continuously stopping an operation of pulse width modulation controller when detecting the overvoltage or the undervoltage.

2. The switching mode power supply of claim 1, wherein said overvoltage and overcurrent protection circuit comprises:

an overvoltage detecting section for sensing whether an overvoltage occurs on a coil of a plurality of the coils or not and transmitting an overvoltage detecting signal;

an undervoltage detecting section for sensing whether an undervoltage occurs on other coil of a plurality of the coils or not and transmitting an undervoltage detecting signal; and an operation interrupting section for inputting the overvoltage detecting signal from the overvoltage detecting section and the undervoltage detecting signal from the undervoltage detecting section and transmitting a stopping signal continuously to interrupt an operation of pulse width modulation controller.

3. The switching mode power supply of claim 2, wherein said overvoltage detecting section detects an overvoltage from a voltage of the coil of the highest turns ratio except the coil connected to the error detection and feedback section to apply a voltage error to pulse width modulation controller of a plurality of the coils so as to sense whether an overvoltage occurs on a plurality of the coils or not.

4. The switching mode power supply of claim 3, wherein said overvoltage detecting section detects an overvoltage by means of the tertiary coil of the switching transformer.

5. The switching mode power supply of claim 2, wherein said undervoltage detecting section detects an undervoltage from a voltage of the coil of the lowest turns ratio of a plurality of the coils so as to sense whether an undervoltage occurs on a plurality of the coils.

6. The switching mode power supply of claim 5, wherein said undervoltage detecting section detects the undervoltage which is applied to a microcomputer.

7. The switching mode power supply of claim 2, wherein said overvoltage detecting section of the overvoltage and overcurrent protection circuit includes:
   a sensor for sensing whether an overvoltage occurs on the coil; and
   a generator for inputting a sensing signal from the sensor and generating an overvoltage detecting signal to an operation interrupting section.

8. The switching mode power supply of claim 7, wherein said sensor of the overvoltage detecting section is connected in series between a ground and a P3 terminal to which a voltage $V_D$ of the coil is applied, and includes R21 and R22 resistors for dividing a voltage $V_D$ applied through the terminal and outputting a sensing signal.

9. The switching mode power supply of claim 7, wherein said generator of the overvoltage detecting section includes:
   a ZD21 zener diode for inputting a sensing signal applied from the sensor and generating an overvoltage detecting signal to the operation interrupting section, and a cathode of the zener diode is connected to the sensor and an anode thereof is connected to the operation interrupting section.

10. The switching mode power supply of claim 2, wherein said undervoltage detecting section of the overvoltage and overcurrent protecting circuit includes:
    a sensor for sensing whether an undervoltage occurs on the coil, and
    a generator for inputting a sensing signal from the sensor and generating an undervoltage detecting signal to the operation interrupting section.

11. The switching mode power supply of claim 10, wherein said sensor of the undervoltage detecting section is connected between a ground and a P4 terminal to which a voltage $V_C$ of the coil is applied, and includes:
    R31 and R32 resistors for dividing a voltage $V_C$ applied through the P4 terminal;
    a ZD31 zener diode driven according to the divided voltage of the R21 and R22 resistors a cathode of the ZD31 zener diode being connected to the connecting point of the R31 and R32 resistors; and
    a photocoupler for outputting an undervoltage sensing signal according to the driving state of the zener ZD31 diode, the photocoupler being connected to the ZD31 zener diode.

12. The switching mode power supply of claim 10, wherein said generator of the undervoltage detecting section includes:
    a Q31 first transistor whose base is connected to the sensor and a power voltage is applied to an emitter, the Q31 first transistor being driven by a sensing signal from the sensor;
    a R35 first resistor connected between an emitter and a collector of the transistor;
    a Q32 second transistor whose base is connected to a collector of the Q31 transistor and a power voltage $V_C$ is applied to an emitter of the Q32 transistor through the P3 terminal, the second transistor generating an undervoltage detecting signal according to the driving state of the first transistor; and
    a R36 second resistor connected to a collector of the Q32 transistor, the R36 second resistor applying an undervoltage detecting signal to the operation interrupting section.

13. The switching mode power supply of claim 2, wherein said operation interrupting section of the overvoltage and overcurrent protection includes:
    an operation interrupting for inputting an overvoltage detecting signal from the overvoltage detecting section or an undervoltage detecting signal from an undervoltage detecting section and outputting an operating interrupting signal to pulse width modulation controller; and
    an interruption state maintaining for inputting the operation interrupting signal from the operation interrupting and outputting a signal to maintain an operation interrupting state of pulse width modulation controller.

14. The switching mode power supply of claim 13, wherein said operation interrupting of the operation interrupting section includes:
    a Q11 transistor whose emitter is grounded, the overvoltage detecting signal from the overvoltage detecting section or the undervoltage detecting signal from said undervoltage detecting section being applied to a base thereof; a R11 resistor connected to the base thereof; and
    a D11 diode whose cathode is connected to a collector thereof and an anode is connected to the pulse width modulation controller, the D11 diode outputting an operation interrupting signal to the pulse width modulation controller according to the driving state of the pulse width modulation controller.

15. The switching mode power supply of claim 13, wherein said interruption state maintaining means of the operation interrupting section includes:
    a Q12 transistor whose base and emitter are connected to the operation interrupting section, the transistor inputting the operation interrupting signal from the operation interrupting section and outputting a maintaining signal of an interruption state of the pulse width modulation controller; and
    R12 and R13 resistors connected between a power voltage Vcc applying P1 terminal and the interruption state maintaining means in series, the resistors dividing the power voltage Vcc and applying to an emitter of the Q12 transistor.

16. The switching mode power supply of claim 2, wherein said overvoltage and overcurrent protection circuit further includes a voltage regulating section for inputting a voltage of the fourth coil, and applying a constant voltage Vcc to the P1 terminal independent of a voltage change of the fourth coil.

17. The switching mode power supply of claim 16, wherein said voltage regulating section includes:
    a R41 resistor whose end is connected to an undervoltage detecting section and a voltage of the fourth coil is applied to an other end thereof through the P3 terminal;
    a Q41 transistor whose base is connected to other end of the resistor and a power voltage of the fourth coil is applied to a collector thereof through the terminal, the transistor outputting a constant power voltage Vcc to the P1 terminal independent of the voltage change of the fourth coil applied through the P3 terminal; and a ZD41 zener diode connected to the base of the Q41 transistor, the ZD41 zener diode applying a constant voltage to the base of the Q41 transistor independent of the voltage change of the fourth coil applied through the P3 terminal.

18. A display apparatus comprising:

a video circuit for inputting a vertical synchronizing and a horizontal synchronizing and a video signal;

a deflecting circuit for deflecting an electrical beam to a vertical and horizontal direction;

a switching mode power supply for applying a power voltage $V_A$, $V_B$, $V_C$ and $V_D$, outputted from the output to the video circuit and the deflecting circuit which includes a rectifier for rectifying AC voltage applied through an AC input into DC voltage;

a switching transformer for receiving DC voltage to a primary coil, and inducing respective different predetermined voltages to a plurality of coils of the secondary and third side of respective different turns ratio from the rectifier;

an output for inputting respective different predetermined voltages outputted through coils of the switching transformer and rectifying and smoothing inputted voltages, and outputting respective different voltages $V_A$, $V_B$, $V_C$ and $V_D$;

an error detection and feedback section for inputting the voltage $V_A$ of the coil whose turns ratio is the highest of voltages outputted through the output and detecting voltage errors;

a switching output for outputting a control signal so as to switch the switching transformer;

a current sensor for sensing a current signal transmitted from the switching output;

a pulse width modulation controller for inputting a voltage error fed back from the error detecting and feedback section and an output current from the current sensing section and a voltage of the third coil, and outputting pulse width modulation signal which duty cycle is modulated in accordance with these input signals to the switching output section; and an overvoltage and overcurrent protecting circuit for detecting whether an overvoltage from a plurality of the coils occurs, whether an undervoltage from a plurality of the coils occurs, and continuously stopping an operation of the pulse width modulation controller when detecting the overvoltage or the undervoltage;

a display for displaying a video signal transmitted from the video circuit according to the respective display mode by an electrical beam transmitted from the deflecting circuit; and a microcomputer for controlling the video circuit and the deflecting circuit so that depending on a power of the switching mode power supply, the display means can display the video signal according to the respective display mode.

* * * * *